United States Patent [19]

Duret et al.

[11] Patent Number: 4,469,356

[45] Date of Patent: Sep. 4, 1984

[54] CONNECTING DEVICE AND METHOD

[75] Inventors: Maurice L. Duret, Aix en Provence; Yves M. L. Nicolas, Marseilles, both of France

[73] Assignee: Societe Nationale Industrielle Aerospatial, France

[21] Appl. No.: 410,896

[22] Filed: Aug. 24, 1982

Related U.S. Application Data

[63] Continuation of Ser. No. 176,870, Aug. 11, 1980.

[30] Foreign Application Priority Data

Sep. 3, 1979 [FR] France ................................. 79 22005

[51] Int. Cl.³ .............................................. F16L 25/00
[52] U.S. Cl. ................................. 285/332; 285/382.5; 285/384; 29/507; 29/523
[58] Field of Search .................. 285/382.4, 382.5, 384, 285/233, 382.2, 353, 424, 382; 29/507, 523

[56] References Cited

U.S. PATENT DOCUMENTS

| 1,296,016 | 3/1919 | Smith ............................. 285/382.5 X |
| 1,994,210 | 3/1935 | Chobert .......................... 29/523 X |
| 2,687,316 | 8/1954 | Voegeli ........................... 285/382.2 |
| 2,821,415 | 1/1958 | Rule ............................... 285/382.2 X |
| 2,902,299 | 9/1959 | Turner ............................ 285/353 X |
| 2,976,907 | 3/1961 | Harvey et al. .................. 285/382.2 X |
| 3,183,021 | 5/1965 | Rickard ........................... 285/424 X |
| 3,370,870 | 2/1968 | Mahoff ........................... 285/382.5 X |
| 3,434,194 | 3/1969 | Whittaker et al. .............. 29/523 X |
| 3,484,123 | 12/1969 | Van Der Velden ......... 285/382.5 X |
| 3,924,883 | 12/1975 | Frank ........................... 285/382.5 X |
| 4,100,668 | 7/1978 | Ruff et al. ..................... 285/382.5 X |
| 4,161,273 | 7/1979 | Jeffers . |
| 4,183,555 | 1/1983 | Martin .......................... 285/382.4 X |
| 4,289,340 | 9/1981 | Press .............................. 285/382.4 |
| 4,319,393 | 3/1982 | Pogonowski .................... 24/523 X |

FOREIGN PATENT DOCUMENTS

| 2744345 | 5/1979 | Fed. Rep. of Germany . |
| 955523 | 1/1950 | France . |
| 148546 | 7/1931 | Switzerland . |
| 1535564 | 3/1932 | Switzerland ................. 285/DIG. 7 |
| 28641 | of 1904 | United Kingdom ............. 285/382.5 |
| 1191111 | 5/1970 | United Kingdom . |

Primary Examiner—Dave W. Arola
Attorney, Agent, or Firm—Marshall, O'Toole Gerstein, Murray & Bicknell

[57] ABSTRACT

Process for providing a rigid pipe, particularly made of light alloy, with a connecting section comprising a projecting peripheral bead, whereby a reinforcing sleeve is firstly positioned at a free end of said pipe, after which said end provided with its sleeve is deformed to the shape desired for said connecting section said process further comprising the step of deforming said end and said sleeve together to form, in the connecting section, the projecting peripheral bead, which thus participates in the connection of said sleeve on said pipe end.

9 Claims, 8 Drawing Figures

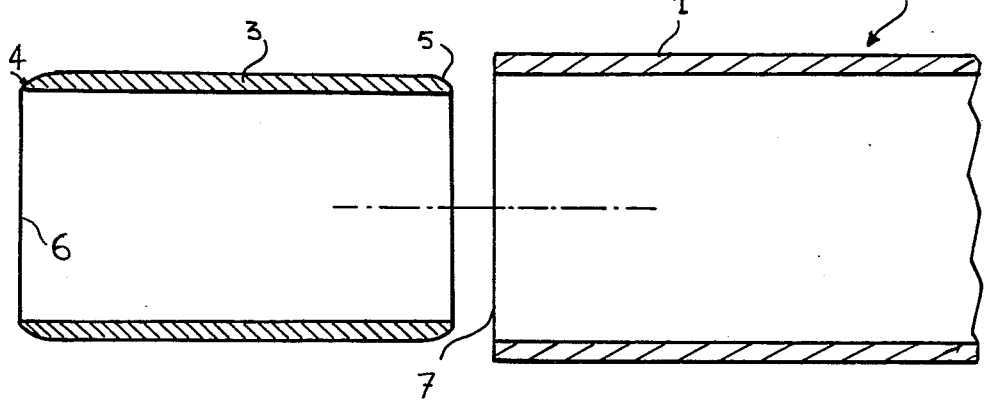
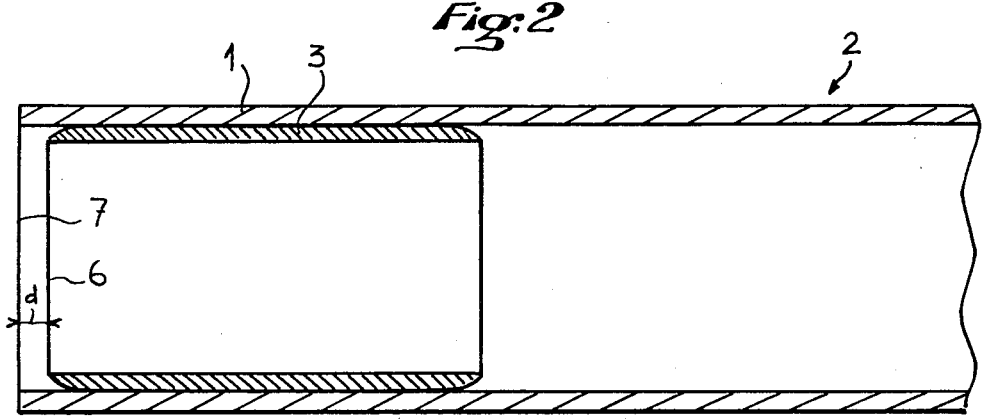
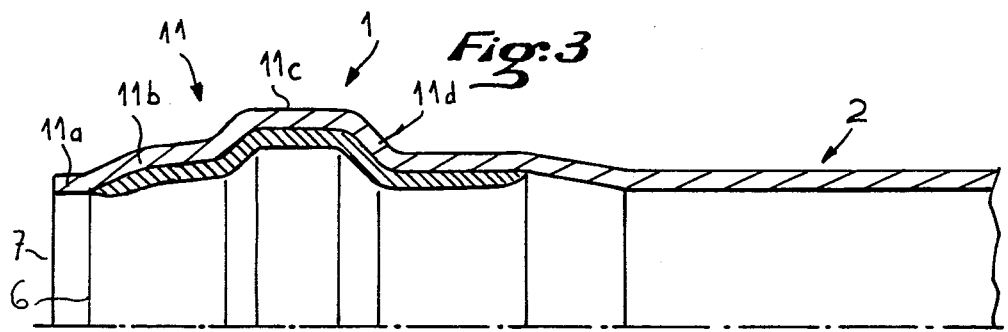

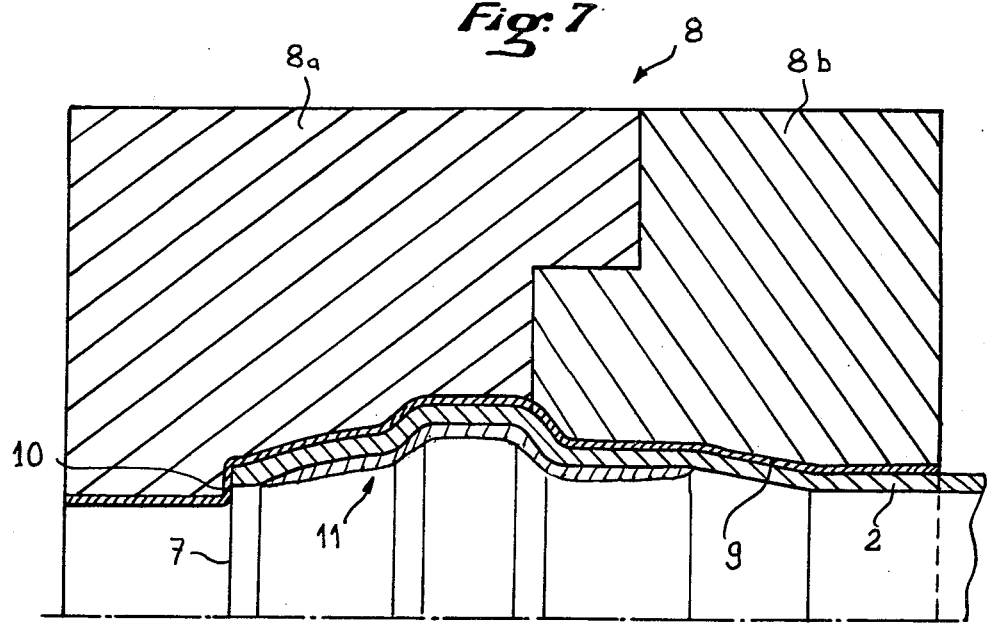
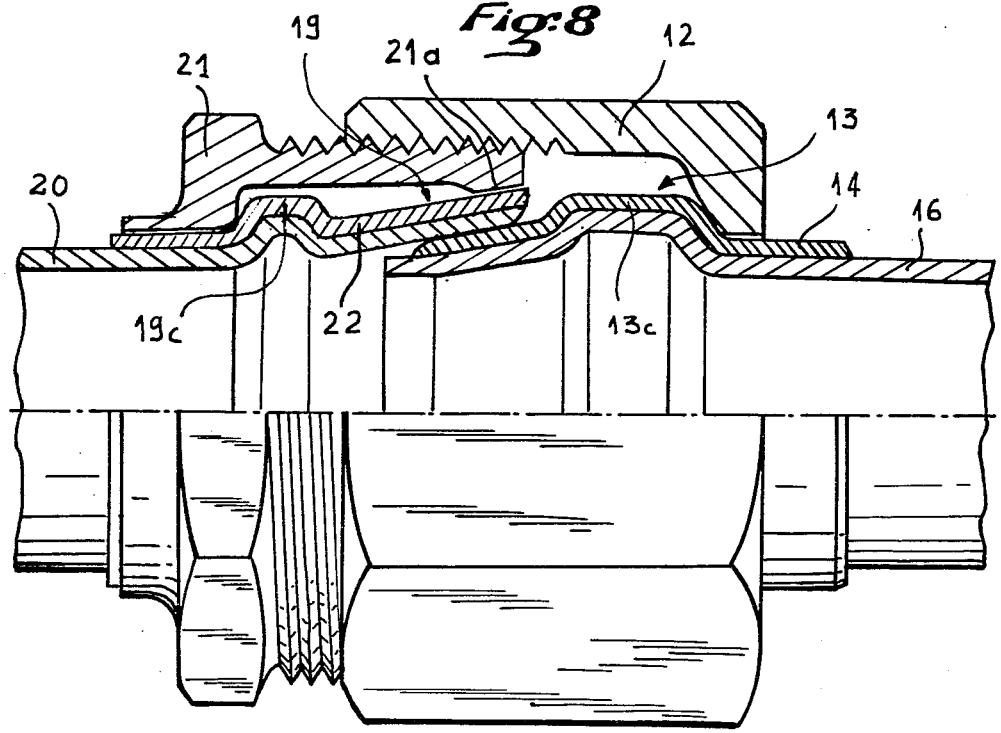

CONNECTING DEVICE AND METHOD

This is a continuation of application Ser. No. 176,870, filed Aug. 11, 1980.

The present invention relates to a process for connecting pipes either to other pipes or to user, supply, etc . . . devices, and it is applied more particularly, but not exclusively, to the pipes transporting fluid used on board aircraft, and will be described more particularly in connection with this application.

Numerous pipes are known to exist on board airplanes, helicopters, etc . . . , which are intended for conveying fluids. For reasons of weight, these pipes are made of light alloy. When it is desired to connect such pipes either to one another or to user or supply devices, special connectors are fixed to their ends by welding, crimping, etc . . . . A known method of this type presents drawbacks, in that such connectors are machined, and are consequently heavy and expensive.

It is an object of the present invention to remedy these drawbacks and it relates to this end to a process for connecting the pipes without using such connectors, thus making cost- and weightsaving.

To this end, according to the invention, the process for providing a rigid pipe, particularly made of light alloy, with a connector, i.e., a connecting section have a contour adapted to mate with a similar or complementary section of another pipe, the connecting section having a projecting peripheral bead spaced from the free end of the pipe. In accordance with the method of the invention a reinforcing sleeve is firstly positioned at a free end of said pipe, after which said end provided with its sleeve is deformed to the shape desired for said connector, is characterised in that said end and said sleeve are deformed together to form, in the connector, the projecting peripheral bead which thus participates in the connection of said sleeve on said pipe end.

A connector is thus obtained which is light and inexpensive, forming one piece with said pipe, without machining, nor welding of an added connector. The sleeve is rendered integral with the end of the pipe by forming and it reinforces said end at the moment of forming.

The sleeve is preferably applied with easy fit on or in said pipe end and its end edges are bevelled or rounded opposite the surface of said pipe end in order not to mark the latter at the moment of forming.

It is advantageous to provide the connector with a bead serving as stop for a connecting nut which may slide freely on the pipe.

When the connector is of male type, the section at its free end may be olive-shaped. When it is of female type, the section at its free end may be conical.

The radial expansion of the pipe and its sleeve may be obtained by any known process. However, it is advantageous to employ the process known as electromagnetic forming.

The invention will be more readily understood on reading the following description with reference to the accompanying drawings, in which:

FIGS. 1 to 3 illustrate the embodiment of a connector with inner sleeve according to the present invention.

FIG. 7 shows, in axial half-section, a matrix for forming the connectors of FIG. 3 or 6.

FIG. 8 shows, half in axial section, half in outside view, a connection between two pipes according to the invention.

Figure 4:
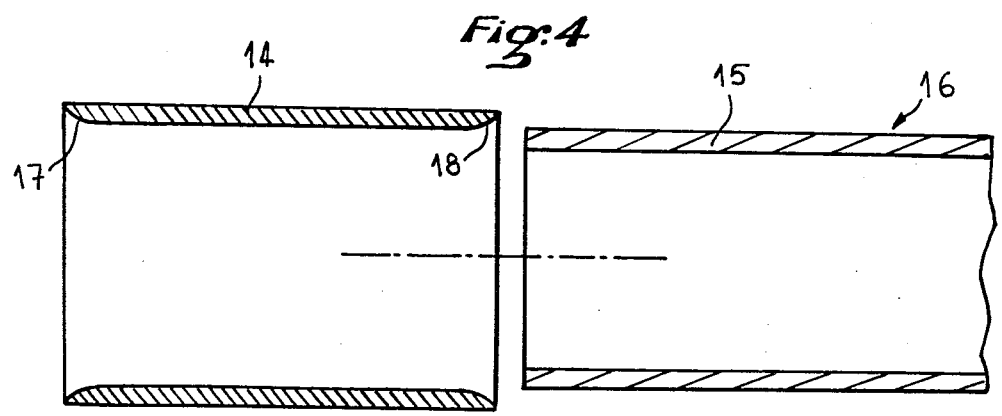
FIGS. 4 to 6 illustrate the embodiment of a connector with outer sleeve, according to the present invention.

Referring now to the drawings, FIG. 1 shows an end 1 of a pipe or tube 2 for example made of a light alloy and intended for conveying a fluid under pressure on board an aircraft. A sleeve 3, for example made of stainless steel, is inserted into this end 1, coaxially to said pipe 2 and sliding with easy fit therein (cf.FIG. 2). In order not to mark the pipe 2 during the subsequent forming operation, the outer end edges 4 and 5 of the inner sleeve 3 are bevelled or rounded. The inner sleeve 3 is preferably introduced into the pipe 2 so that its end face 6 is recessed by a distance d with respect to the corresponding end face 7 of said pipe.

The end 1 of the pipe 2, provided with its inner sleeve 3, is then inserted in a matrix 8 composed of at least two parts 8a and 8b (part 8b may be connected in two parts of which the plane of join is dimetrical), internally provided with a cavity 9 of revolution of which the section corresponds to the outer section of the connector to be obtained. The cavity 9 comprises a shoulder 10 against which the end face 7 of the pipe 7 abuts, so that said shoulder serves to position the end 1 inside the cavity 9 of the maxtrix 8.

The end 1 and its inner sleeve 3 are then expanded radially, by any known process such as those employing expansion of an elastomer, compression of a fluid or a metal, electromagnetic forming, etc . . . , until said end 1 is applied under pressure against the wall of the inner cavity 9 of the matrix 8.

A shaped connector 11, integral with the pipe 2 is thus obtained at the end 1 of said pipe.

In FIG. 3, the connector 11 illustrated is of male type and has a standard section according to aeronautic specifications. This standard section comprises a cylindrical mouthpiece 11a, followed by an olive-shaped portion 11b, itself extended by a swell 11c, forming a shoulder 11d on the side opposite the end face 7. This shoulder 11d serves, as shown in FIG. 8, as support for a nut 12, through which the pipe 2 passes and adapted for connection to any desired device.

The radial expansion of the end 2 in the matrix 8 is, however, preferably obtained by a high speed process of forming by deformation, for example electromagnetic forming. Known machines for forming by electromagnetic pulses are composed of an energy accumulation circuit, generally constituted by a capacitor battery, a circuit for the controlled discharge of this energy and a user circuit essentially constituted by possibly consumable working coils. These coils are introduced inside the end 2. Due to the magnetic field of said coils and to the eddy currents that this magnetic field creates in the thickness of the end and the inner sleeve 3, the latter are subjected to electromagnetic forces applying them against the walls of the cavity 9.

Figure 5:
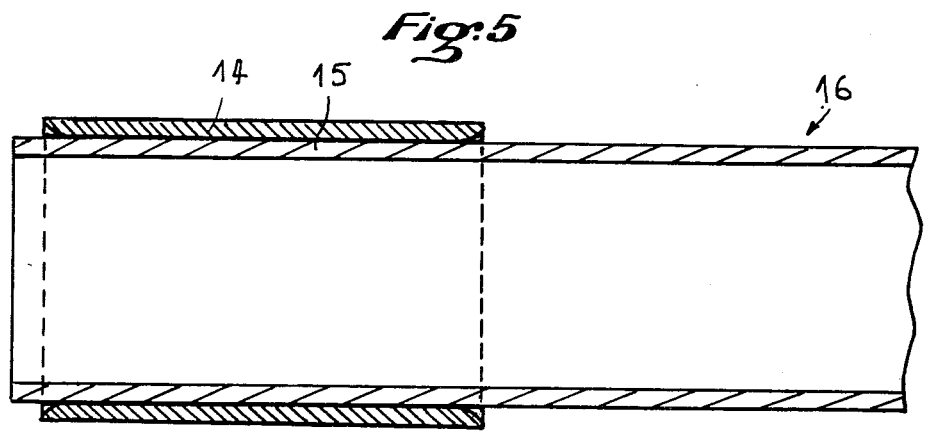
Figure 6:
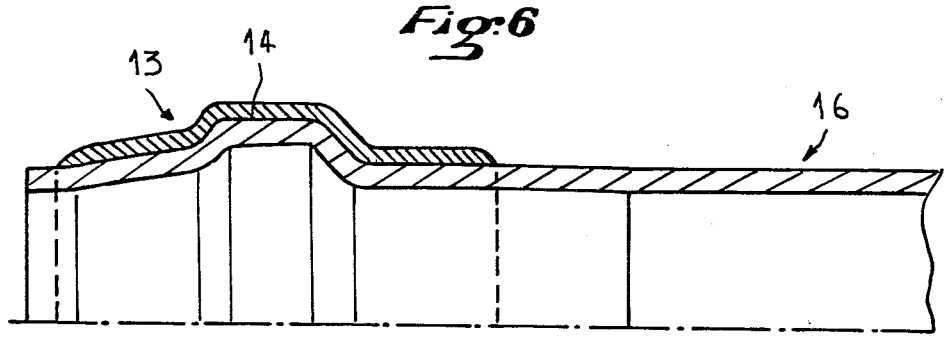

FIGS. 4 to 6 illustrate the embodiment of a connector 13 with outer sleeve 14, at the end 15 of a pipe 16. The outer sleeve 14 whose inner end edges 17 and 18 have been bevelled or rounded, is slid on this end 15. The end 15 provided with its sleeve 14 is then shaped, in a matrix similar to matrix 8, in the way as has been described with regard to connector 11, and the connector 13 of FIG. 6 is obtained.

Although FIGS. 1 to 6 have illustrated the embodiment of male connectors, it is obvious that the process according to the invention may also be used for making female connectors, for example such as the one referenced 19 if FIG. 8 and having an outwardly flared conical section. This FIG. 8 illustrates the connection between the pipe 16 provided with its male connector 13 and a pipe 20, at the end of which the female connector 19 is shaped. This connection is locked by means of two cooperating nuts 12 and 21, through which pipes 16 and 20 respectively pass freely and which abut on the rear shoulders of beads 13c and 19c forming part of said connectors 13 and 19. The locking nut 21 comprises, inside its threaded end, a conical shoulder 21a on which abuts the end of the sleeve 22 of the female connector 19, so as to avoid an excessive deformation of this connector when the nuts 12 and 21 are tightened.

As will be noted in FIG. 8, the sleeve 14 of the male connector 13 is external, like the sleeve 22 of the female connector 19, with the result that the cooperating nuts 12 and 21 abut, when they are tightened, on the rear shoulders of these sleeves. As these sleeves are chosen to be mechanically stronger than the pipes 16 and 20, said connectors withstand without deterioration numerous successive assembly and dismantling operations. However, it is obvious that the sleeve 14 could be internal (like sleeve 3) and that sleeve 22 could also be internal.

Moreover, it will be readily understood that the connectors 11, 13, 19 according to the invention may serve to connect the corresponding pipes to devices other than pipes, such as for example sources of pressurised fluid, hydraulic motors, jacks, etc . . . .

What is claimed is:

1. A process for providing a free end of a deformable rigid pipe with a connecting section having a desired contour adapted to mate with a connecting section of another pipe, said connecting section including an individual unobstructed external outwardly projecting circumferential reinforced bead spaced from the free end of said pipe, said process comprising the steps of:

positioning at said free end a concentric reinforcing sleeve having smooth inner and outer walls made of a material which is mechanically stronger than said pipe, without any connection between said pipe and said sleeve which can inhibit slippage between said sleeve and said pipe, said sleeve having end edges which are bevelled or rounded facing the surface of said pipe, and simultaneously radially expanding a section of said end and said sleeve to form said contour and said bead within the overlapping length of said pipe and said sleeve, the outer surfaces of both of said end and said sleeve being correspondingly expanded to the contour of said head.

2. A pipe having a connecting section formed in accordance with the process of claim 1.

3. The process of claim 1, wherein the sleeve is disposed inside the pipe end.

4. The process of claim 1, wherein the sleeve is disposed outside the pipe end.

5. The process of claim 1, wherein the connecting section is of the male type and the contour of its free end is olive shaped.

6. The process of claim 1, wherein the connecting section is of the female type and the contour of its free end is conical.

7. The process of claim 1, wherein the radial expansion of the pipe and its sleeve is obtained by electromagnetic forming.

8. A pipe joint comprising two pipes each of which has a connecting section formed adjacent one of its end in accordance with the process of claim 1, the connecting section in one of said sections being of the male type, the connecting section in the other of said sections being of the female type having a contour which is conical and adapted to receive said male connecting section, and first and second nuts respectively encircling and slidable on one of said pipe sections, said nuts being engageable to form a coupling interconnecting said pipes, each of said nuts being adapted to abut the circumferential bead of its associated connecting section.

9. A joint in accordance with claim 8 wherein one of said nuts includes a conical shoulder serving as outer peripheral support for the conical contour of the female connecting section.

* * * * *